(12) United States Patent
Panasik

(10) Patent No.: US 8,082,181 B2
(45) Date of Patent: Dec. 20, 2011

(54) TOOL HAVING AN INTEGRAL SYSTEM FOR REMOTELY ORDERING INVENTORY

(75) Inventor: Cheryl L. Panasik, Elburn, IL (US)

(73) Assignee: Illinois Tool Works, Inc., Glenview, IL (US)

( * ) Notice: Subject to any disclaimer, the term of this patent is extended or adjusted under 35 U.S.C. 154(b) by 1180 days.

(21) Appl. No.: 11/040,978

(22) Filed: Jan. 21, 2005

(65) Prior Publication Data

US 2006/0167770 A1    Jul. 27, 2006

(51) Int. Cl.
*G06Q 30/00* (2006.01)
(52) U.S. Cl. ...................................... 705/26.1
(58) Field of Classification Search ............ 705/26, 705/28, 1, 1.1
See application file for complete search history.

(56) References Cited

U.S. PATENT DOCUMENTS

| | | | | |
|---|---|---|---|---|
| 5,459,304 | A * | 10/1995 | Eisenmann | 235/380 |
| 6,282,522 | B1 * | 8/2001 | Davis et al. | 705/41 |
| 6,880,750 | B2 * | 4/2005 | Pentel | 235/380 |
| 7,234,640 | B2 * | 6/2007 | Pentel | 235/384 |
| 7,457,763 | B1 * | 11/2008 | Garrow et al. | 705/8 |
| 7,613,590 | B2 | 11/2009 | Brown | |
| 2001/0056385 | A1 * | 12/2001 | Timms et al. | 705/27 |
| 2004/0230489 | A1 * | 11/2004 | Goldthwaite et al. | 705/26 |
| 2008/0270261 | A1 * | 10/2008 | Horton | 705/26 |
| 2008/0301001 | A1 * | 12/2008 | Baumgartner et al. | 705/26 |

FOREIGN PATENT DOCUMENTS

| | | |
|---|---|---|
| DE | 19745641 A1 | 11/1999 |
| GB | 1320630 | 6/1973 |
| JP | 63046567 | 2/1988 |

OTHER PUBLICATIONS

Automating an Industry.(Brief Article) Appliance , v 58 , n 4 , p. S1. Apr. 2001.*

* cited by examiner

*Primary Examiner* — Matthew Gart
*Assistant Examiner* — Seye Iwarere
(74) *Attorney, Agent, or Firm* — Greer, Burns & Crain, Ltd.; Patty Chidiac; Mark W. Croll

(57) ABSTRACT

A host tool having an integral system for ordering inventory from an inventory order interface has a processing unit, a location provider and a remote connector. The location provider is configured to selectively provide the location of the host tool to the processing unit, while the remote connector is configured to establish a remote connection between the processing unit and an inventory order interface of the supplier of the inventory. A customer identification card having order information is selectively connected to the host tool. When the card is connected, the information is read by and transmitted from the host tool to the inventory order interface through the remote connector. The processing unit is configured to interface location information from the location provider, payment information and order information from the customer identification card, through the remote connector, to place an order for inventory at the inventory order interface.

12 Claims, 2 Drawing Sheets

TOOL HAVING AN INTEGRAL SYSTEM FOR REMOTELY ORDERING INVENTORY

BACKGROUND OF THE INVENTION

The present invention relates generally to host tools using consumables and requiring the repeated ordering of consumables, and specifically to fastener-driving tools requiring the repeated ordering of fasteners.

Host tools using consumables are known in the art, and one type of such tool, also known as BUILDEX® brand tools for use in driving fasteners into workpieces, is described in commonly assigned patents to Nikolich U.S. Pat. Re. No. 32,452, and U.S. Pat. Nos. 4,522,162; 4,483,473; 4,483,474; 4,403,722; 5,197,646; 5,263,439 and 6,145,724, all of which are incorporated by reference herein. Similar nail and staple driving tools are available commercially from ITW-Paslode of Vernon Hills, Ill. under the IMPULSE®, BUILDEX®□ and PASLODE® brands.

Such tools typically incorporate a tool housing enclosing a small internal combustion engine. The engine is powered by a canister of pressurized fuel gas, also called a fuel cell. A battery-powered electronic power distribution unit produces a spark for ignition. The engine includes a reciprocating piston with an elongated, rigid driver blade disposed within a single cylinder body.

Upon the pulling of a trigger switch, which causes the spark to ignite a charge of gas in the combustion chamber of the engine, the combined piston and driver blade is forced downward to impact a positioned fastener and drive it into the workpiece. The piston then returns to its original, or pre-firing position, through differential gas pressures within the cylinder. Fasteners are fed magazine-style into the nosepiece, where they are held in a properly positioned orientation for receiving the impact of the driver blade. However, since fasteners are consumed during the use of the tool, the user must take care to provide the fastener driving tool with ample fasteners. This is typically done by placing an order with the supplier of the fastener in one of five ways:

1) Placing a phone call—Placing a telephone call is inconvenient and time consuming, particularly on the jobsite where a telephone may not be available.

2) Placing a fax order—Faxing an order requires one to type out or write the order information, and further, requires the user to have access to an electrical connection, a fax machine, and a phone line.

3) Mailing an order—Ordering by United States Postal service, or any other courier, takes an excessive amount of time and can be costly when the order is expedited.

4) Internet ordering—Placing an order using the Internet and the supplier's WEB page requires the user to have a computer and a connection to the Internet, access to which may be limited on a construction site. Additionally, the method can be time consuming because the shipping information and the payment information must be gathered and entered into the website.

5) Point of Sale purchase—Going to the supplier's location and ordering or obtaining the product is inconvenient to the user, requires transportation expenses, and takes the user away from the work project. In the case of a construction worker, going to the supplier takes the worker away from income generating activities.

Thus, there is a need for a host tool which addresses the drawbacks of the prior art.

BRIEF SUMMARY OF THE INVENTION

The above-identified needs are met or exceeded by the present host tool having an integral system for ordering inventory from an inventory order interface. The tool has a processing unit, a location provider and a remote connector. The location provider is configured to selectively provide the location of the host tool to the processing unit, while the remote connector is configured to establish a remote connection between the processing unit and an inventory order interface of the supplier of the inventory. A customer identification card having order information is selectively connected to the host tool. When the card is connected, the information is read by and transmitted from the host tool to the inventory order interface through the remote connector. The processing unit is configured to interface location information from the location provider, payment information and order information from the customer identification card, through the remote connector, to place an order for inventory at the inventory order interface.

Further, a method for ordering inventory from an inventory order interface using a host tool having a customer identification card reader includes the step of providing power to the host tool. When power is provided, a customer identification card can be connected to the customer identification card reader to transmit order information to the host tool. A connection between the host tool and the inventory order interface is automatically established, and the order information from the host tool to the inventory order interface is automatically transmitted.

A customer identification card for providing order information to a host tool is also provided. The customer identification card includes payment information and order information. The customer identification card is configured to be electrically or magnetically connected to the host tool to enable the host tool to read the payment and the order information.

DETAILED DESCRIPTION OF THE INVENTION

Figure 1:
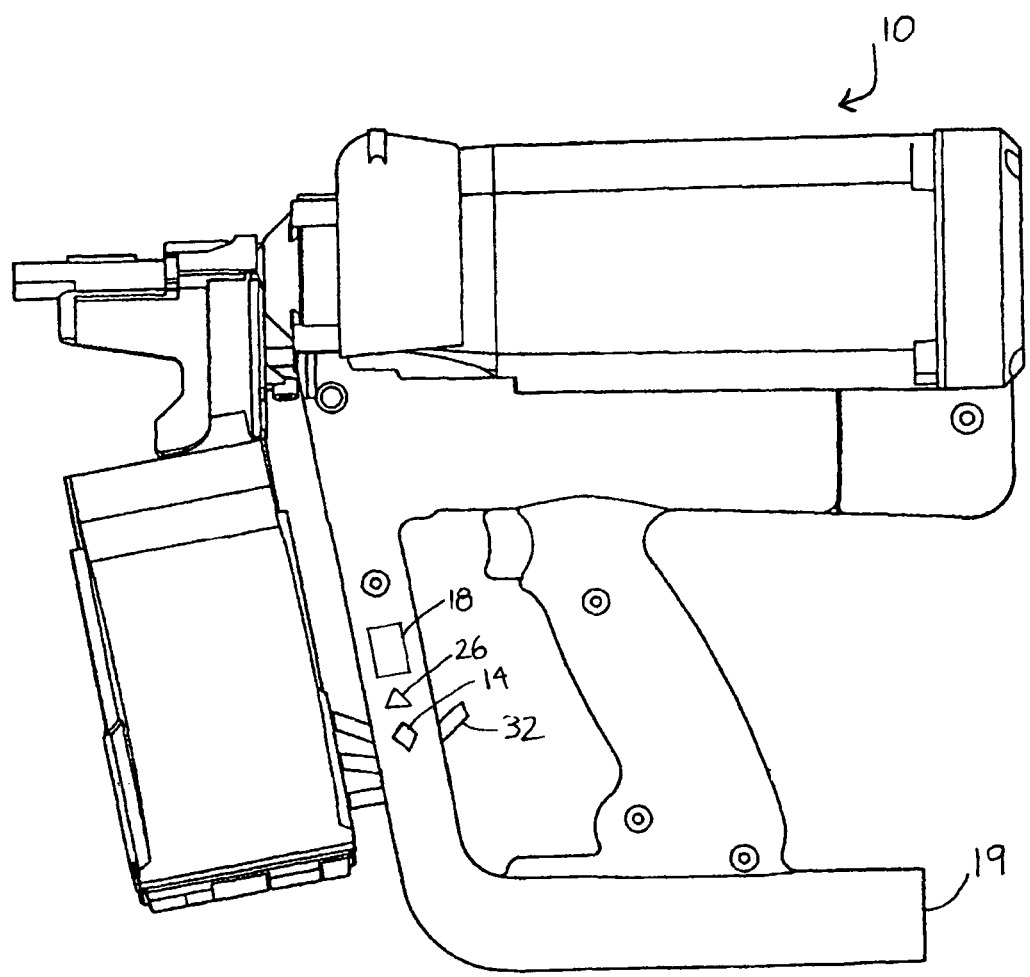
FIG. 1 is a side view of the present tool having remote ordering capability.

Referring now to FIG. 1, an apparatus having an integral system for remotely ordering inventory is designated 10. While the present apparatus 10 is depicted as a fastener driving tool, it is contemplated that the present principles of operation are convertible into any mechanical device associated with the use of consumables. For purposes of this application, the apparatus will herein be referred to as the host tool 10 and the consumables will generally be referred to as inventory.

Figure 2:
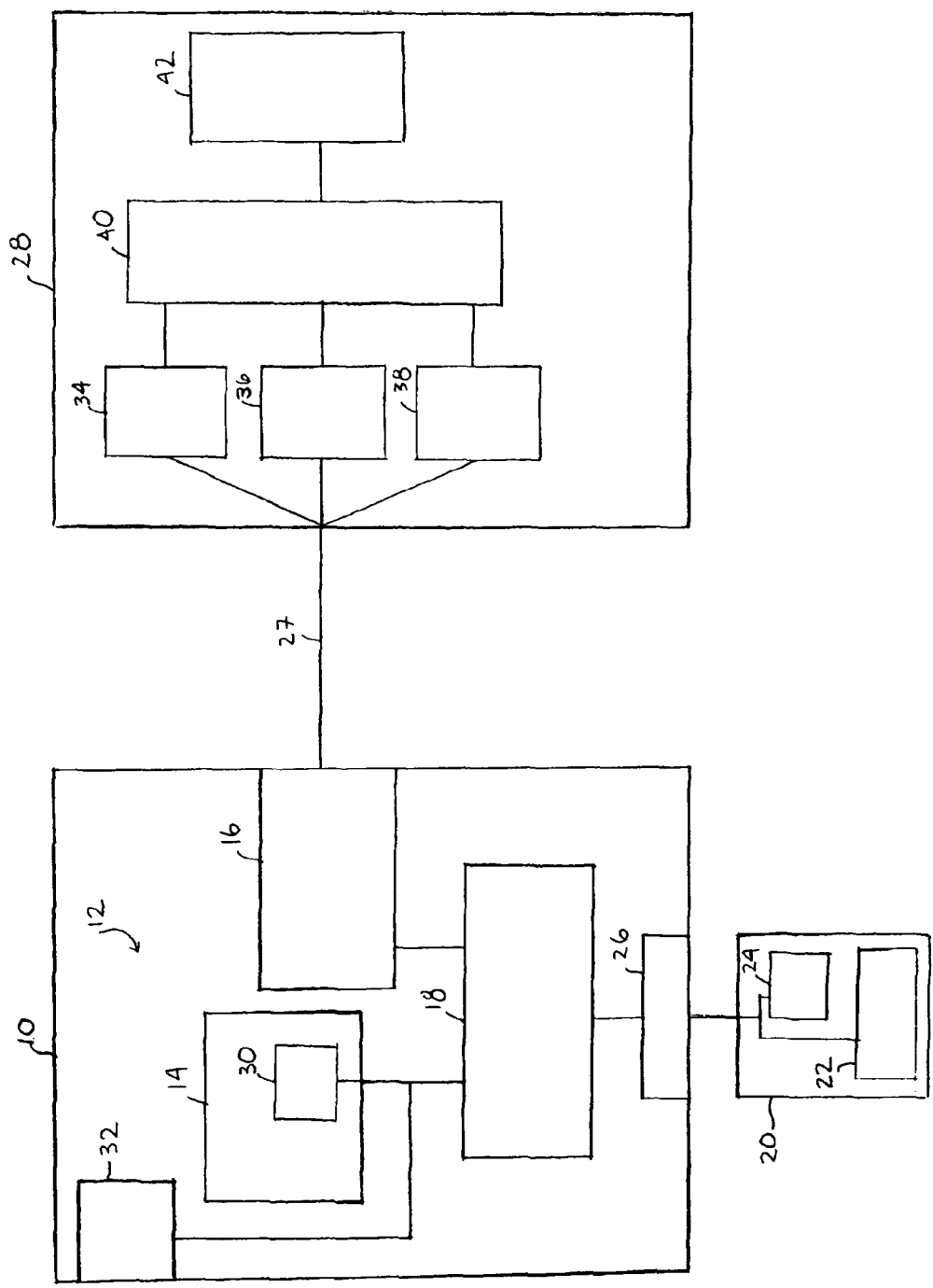
FIG. 2 is a constitutional diagram of the host tool and an inventory order interface.

More specifically and with reference to FIG. 2, the host tool 10 includes an integral system 12 having a location provider 14, a remote connector 16 and a processing unit 18 disposed within the host tool. The host tool 10 allows the user to remotely order inventory from a supplier, such as consumables like fasteners, through the integral system 12. When the user decides to order inventory, the user first provides power to the host tool 10. It is contemplated that the system 12 is powered by an internal tool battery 19.

Then, the user provides a customer identification card 20, similar to a debit bank card or other monetary payment card, which has payment information 22 and order information 24. The payment information 22 can be associated with a bank account number, a credit account number, or any other manner of payment. The order information 24 can include the predetermined order quantity, the product type, the user's main shipping address, office address, phone number, or any other information required by the supplier of the inventory.

The customer identification card 20 is selectively connected either electrically or magnetically to an identification card reader 26 disposed on the host tool 10. The identification card reader 26 is the hardware on the host tool 10 that the user preferably swipes or otherwise engages the identification card 20. The card reader 26 allows the host tool 10 to read and to transmit to the processing unit 18 the payment information 22 and the order information 24 when the card 20 is selectively connected.

When the payment information 22 and the order information 24 are read by the processing unit 18, the payment and the order information 22, 24 are automatically transmitted to the remote connector 16 by the processing unit 18. The remote connector 16 is preferably a cellular card for a cell wireless connection, a wireless Internet connection or a modem for a direct modem connection. The remote connector 16 is configured to establish a remote connection 27 between the processing unit 18 and an inventory order interface 28 of the supplier. When the remote connection 27 is established, the processing unit 18 automatically sends the payment information 22 and the order information 24 to the supplier through the inventory order interface 28, to be described with more particularity later.

In order to direct the shipment of the inventory directly to the host tool 10, the location provider 14 is provided. The location provider 14 is preferably a global positioning system (GPS) receiver disposed in the host tool 10 and used to trilaterate the location of the tool on the earth's surface. The location of the host tool 10, as determined by the location provider 14, is provided to the processing unit 18 as location information 30. The processing unit 18, in turn, provides the location information 30 to the inventory order interface 28.

Configured to selectively provide the location information 30 to the processing unit 18, the location provider 14 can be overridden by a bypass switch 32. When the bypass switch 32 is activated, the switch allows the location provider 14 to be by-passed to direct shipment of the inventory to a default location stored in the processing unit 18 or the customer identification card 20.

The processing unit 18, preferably a SMART chip, is configured to interface the location provider 14, the remote connector 16 and the customer identification card 20 to provide the inventory order interface 28 of the supplier with the location information 30, the payment information 22 and the order information 24. The processing unit 18 automatically establishes the connection with the inventory order interface 28 to automatically place an order when the customer identification card 20 is connected to the tool 10.

Preferably, the supplier's inventory order interface 28 is fully automated, such as a website or a touchtone system. The inventory order interface 28 receives the order information 24 at an order receiver 34, receives the payment information 22 at a payment receiver 36, and receives the location information 30 at the location receiver 38. When all of the information 22, 24 and 30 has been received, an order generator 40 generates an order for inventory which activates a shipment actuator 42 to ship the inventory. Preferably, the supplier's inventory order interface 28 is accessible by the Internet or by modem, and the transaction preferably takes less than 60 seconds depending on the speed of the processing unit 18.

Although this invention has been described with reference to a fastener driving tool, it is contemplated that other embodiments can have an integral system to remotely order inventory. For example, a user's screw or anchor inventory can be ordered using this system. In the case where multiple types of inventory are required, such as for a cabinet screw organizer, each different type of inventory can be associated with a bar code that is scanned, and the information processed by the processing unit 18. Further, it is contemplated that a land line system can be employed to remotely access the inventory order interface 28. The integral system 12 can also be employed in an automobile where an order is placed with an order interface 28 of a gas service, and the location provider 14 provides the gas service with the location of the automobile.

While specific embodiments of the present method and apparatus for the host tool having an integral system for remotely ordering inventory has been shown and described, it will be appreciated by those skilled in the art that changes and modifications may be made thereto without departing from the invention in its broader aspects and as set forth in the following claims.

What is claimed is:

1. A wireless system of a host power tool that uses consumables, the system for ordering replacement consumables from an inventory order interface, the system comprising:
   a processing unit integral with the host power tool;
   a location provider configured to selectively provide the location of the host power tool to said processing unit;
   a remote connector configured to establish a remote connection between said processing unit and an inventory order interface; and
   a customer identification card in selective communication with the host power tool by the user, and having order information including a predetermined order quantity of consumables, said order information to be read by the host power tool through said selective communication, and wherein said information is automatically transmitted from the host power tool to said inventory order interface through said remote connector without input from the user apart from said selective communication of said customer identification card with the host power tool;
   wherein said processing unit is configured to interface information from said location provider and said customer identification card through said remote connector to automatically place an order for the consumables of the host power tool at the inventory order interface;
   wherein the consumables are fasteners to be driven by the host power tool.

2. The wireless system of claim 1 further comprising a location bypass switch on said host power tool, wherein when the location bypass is not switched on, the consumables are automatically ordered for delivery to the location of the host power tool as provided by said location provider, and when said location bypass is switched on, the location bypass is configured to selectively override said location provider from providing the location of the host power tool to said processing unit, and to further provide a default location to said processing unit to deliver the consumables.

3. The wireless system of claim 1 wherein said remote connector is a cellular card that is capable of connecting to the Internet to access the inventory order interface.

4. The wireless system of claim 1 wherein said remote site connector is a standard Internet connection to the inventory order interface.

5. The wireless system of claim 1 wherein said remote site connector is a direct modem connection to the inventory order interface.

6. The wireless system of claim 1 further comprising a customer identification card reader disposed on the tool for reading and transmitting said order information to said processing unit.

7. The wireless system of claim 6 wherein said selective connection of said customer identification card to the host power tool occurs by the magnetic connection of said customer identification card in said customer identification card reader.

8. A method for ordering consumables from a remote inventory order interface using a host power tool that uses the consumables, the host power tool having a customer identification card reader, the method comprising the steps of:
  providing power to the host power tool;
  placing a customer identification card in communication with the customer identification card reader disposed in the host power tool to transmit order information to the host power tool, wherein the order information is stored on said customer identification card and said order information includes a predetermined order quantity;
  after the order information from the customer identification card has been communicated to the host power tool, the host power tool automatically establishes a connection between the host power tool and the remote inventory order interface; and
  the host power tool automatically transmits the order information from the host power tool to the inventory order interface to order consumables with no input by the user apart from said communication of said customer identification card with the host power tool;
  wherein the consumables are fasteners to be driven by the host power tool.

9. The method of claim 8 wherein the customer identification card is swiped through said customer identification card reader.

10. The method of claim 8 further comprising the step of the host power tool automatically providing location information from a location provider disposed in the host power tool and transmitting said location information to the inventory order interface for delivery of the consumables to the location of the host power tool.

11. The method of claim 10 further comprising the step of selectively bypassing said location provider from providing said location information of the host power tool, and providing a default location to said processing unit for delivery of the consumables.

12. A method for ordering consumables from a remote inventory order interface using a host power tool that uses the consumables, the host power tool having a customer identification card reader, the method comprising the steps of:
  placing a customer identification card in communication with the customer identification card reader disposed in the host power tool to transmit order information stored on the customer identification card including a predetermined order quantity of consumables to the host power tool;
  after the order information from the customer identification card has been communicated to the host power tool, the host power tool automatically establishes a connection between the host power tool and the remote inventory order interface;
  the host power tool automatically transmits the order information from the host power tool to the inventory order interface;
  automatically providing location information from a location provider disposed in the host power tool and transmitting said location information to the inventory order interface for delivery of the consumables to the location of the host power tool; and
  selectively bypassing said location provider from providing said location information of the host power tool, and providing a default location to said processing unit for delivery of the consumables
  wherein the consumables are fasteners to be driven by the host power tool.

* * * * *